US006125165A

United States Patent [19]

Warburton et al.

[11] Patent Number: 6,125,165

[45] Date of Patent: Sep. 26, 2000

[54] TECHNIQUE FOR ATTENTUATING X-RAYS WITH VERY LOW SPECTRAL DISTORTION

[75] Inventors: William K. Warburton, 1300 Mills St., Menlo Park, Calif. 94025; Edward Oltman, Mountain View, Calif.

[73] Assignee: William K. Warburton, Mountain View, Calif.

[21] Appl. No.: 09/219,204

[22] Filed: Dec. 22, 1998

[51] Int. Cl.[7] .................. G01N 23/201

[52] U.S. Cl. .................. 378/86; 378/159; 378/207

[58] Field of Search .................. 378/70, 86, 145, 378/156, 159, 207

[56] References Cited

U.S. PATENT DOCUMENTS

| | | | |
|---|---|---|---|
| 3,752,986 | 8/1973 | Fletcher et al. | 250/394 |
| 3,920,999 | 11/1975 | Drexler et al. | 378/159 |
| 4,189,645 | 2/1980 | Chaney et al. | 250/394 |
| 4,355,230 | 10/1982 | Wilson et al. | 250/252.1 |
| 4,442,496 | 4/1984 | Simon et al. | 364/524 |
| 4,697,280 | 9/1987 | Zarnstorff et al. | 378/207 |
| 4,916,727 | 4/1990 | Sheridan | 378/207 |
| 4,935,950 | 6/1990 | Ranallo et al. | 378/207 |
| 5,381,458 | 1/1995 | Deslattes | 378/207 |
| 5,394,453 | 2/1995 | Harding | 378/86 |
| 5,612,988 | 3/1997 | Martens | 378/86 |

OTHER PUBLICATIONS

Kosanetzky, J. et al., "X–ray Diffraction Measurements of Some Plastic Materials and Body Tissues", *Medical Physics*, vol. 14, No. 4, Jul./Aug. 1987, pp. 526–532.

Matscheko, G. et al., "A Compton Scattering Spectrometer for Determining X–ray Photon Energy Spectra", *Phys. Med. Biol.*, 1987, vol. 32, No. 5, pp. 577–594.

Matscheko, G. et al., "A Generalised Algorithm for Spectral Reconstruction in Compton Spectroscopy with Corrections for Coherent Scattering", *Phys. Med. Biol.*, 1989, vol. 34, No. 7, pp. 835–841.

Platzman, P. et al., "Theory", *Compton Scattering: The investigation of electron momentum distributions*, Chapter 2, (ed. B. Williams, McGraw–Hill, New York, 1977); pp. 26–41.

*Primary Examiner*—David P. Porta
*Attorney, Agent, or Firm*—Townsend and Townsend and Crew LLP

[57] ABSTRACT

A method for attenuating x-rays which is insensitive to the x-ray energy employs forward scattering through a filter element to minimize energy shifts due to Compton scattering. Efficiency can be enhanced by employing a material with a large small angle scattering cross section. Since attenuation in the filter increases rapidly with decreasing x-ray energy, the filter provides larger, thinner scattering areas for low energy x-rays and smaller, thicker scattering areas for higher energy x-rays. By adjusting the relative fractions of the scattering areas and their thicknesses, the total scattering yield through the filter can be made to be essentially independent of x-ray energy over a broad band of x-ray energies.

40 Claims, 7 Drawing Sheets

TECHNIQUE FOR ATTENTUATING X-RAYS WITH VERY LOW SPECTRAL DISTORTION

The U.S. Government has rights in this invention pursuant to Contract No. 1R43 CA69972-01 awarded by the National Institutes of Health, National Cancer Institute.

BACKGROUND OF THE INVENTION

1: Field of the Invention

The present invention relates generally to the field of x-ray interactions with matter and, more particularly, to methods for scattering, filtering and attenuating x-rays.

2: Background on X-Ray Absorption and Scattering

It is often desirable to attenuate x-ray beams. This is commonly done by filtering or scattering methods, which strongly depend upon the x-rays' energy and so alter the spectrum of the incident beam, often drastically. In many cases this is not a serious problem. But in certain cases involving instrumentation calibration procedures, the incident spectrum is precisely the quantity of interest yet attenuation is required because the incident intensity is too high for the measuring instrument. An example is calibrating an x-ray mammography machine using a solid state spectrometer. In these cases it would be beneficial to have a method to reduce intensity without introducing significant amounts of spectral distortion.

In the following sections the interactions between x-rays and matter are briefly described, both because they represent prior art and are relevant to an understanding of the present invention. For x-ray energies below 1.2 MeV, where pair production becomes possible, the three primary mechanisms by which x-rays interact with matter are through its electrons by elastic or Raleigh scattering; Compton scattering; and photoelectric absorption. These processes have been much studied and extensive details may be found in such texts as Warren, B. E., "X-ray Diffraction" (Addison-Wesley, Menlo Park, Calif., 1969), James, R. W., "The Optical Principles of the Diffraction of X-rays" (Oxbow Press, Woodbridge, Conn., 1982), Guinier, A., "X-ray Diffraction in Crystals, Imperfect Crystals, and Amorphous Bodies" (W. H. Freeman, San Francisco, 1963), and Heitler, W., "The Quantum Theory of Radiation", $3^{rd}$. ed. (Oxford University Press, Oxford, 1954).

2.1 Photoelectric Absorption

In photoelectric absorption, an atom absorbs an x-ray and ejects an electron, the photoelectron. For an electron in quantum state i, photoelectron absorption can occur only when the energy of the x-ray, E, exceeds the binding energy $E_i$ of the state i. The photoelectric cross section $\sigma_A(E)$ depends strongly on both the atom's atomic number Z ($\sim Z^4$) and the energy difference ($\sim(E\text{-}Ei)^{-3}$). FIG. 1 shows the photoelectric absorption cross section $\sigma_A(E)$ in iron (Fe) 2, which is seen to vary by several orders of magnitude as a function of x-ray energy E. The fraction A(t,E) of x-rays absorbed in a piece of material of thickness t is given by:

$$A(t,E)=1-\exp(-t\,\mu_A(E)), \tag{1}$$

where $\mu_A(E)$ is the photoelectric absorption coefficient in inverse cm. $1/\mu_A(E)$ is called the absorption length. Using Eqn. 1 and the data of FIG. 1, one can calculate that at 10 keV, for example, only 4 microns of Fe are required to provide 99.9% absorption, whereas at 40 keV 204 microns are required. This strong energy dependence is typical of photoelectric absorption.

2.2 Compton Scattering

In Compton scattering the x-ray photon scatters inelastically from a single electron, transferring momentum and energy to it in the process. FIG. 1 also shows the Compton scattering cross section $\sigma_C(E_x)$ 3 in Fe. This component becomes the dominant energy loss mechanism by about 110 keV. As may be seen, its energy dependence is much slower than that of photoelectron absorption. The general theory of Compton scattering is quite complex, particularly if such issues as x-ray polarization, electron spin and momentum, relativistic terms, and many body interactions are included. [See, for example, Platzman, P. & Tzoar, N., "Theory", Chapter 2 in *Compton Scattering*, ed. B. Williams (McGraw-Hill, New York, 1977).] The present invention, however, may be understood by reference to a simple kinematical description of the x-ray energy loss $\Delta E_C$ in Compton scattering, ignoring x-ray polarization effects:

$$\Delta E_C=E(1-[1+\alpha(1-\cos\theta)]^{-1}) \tag{2}$$

for scattering angle θ where $\alpha=E/m_ec^2=E/511$ keV, $m_e$ is the rest mass of the electron and c is the speed of light.

2.3 Elastic Scattering

In elastic scattering the x-ray does not lose energy but exchanges momentum with electrons by electric field interactions. The details of this process are complex, both because of resonances which can occur when the energy of the x-ray is near to an atomic absorption edge and also because of interference phenomena which occur if the locations of either the electrons (e.g. in atoms) or the atoms they are attached to (e.g. in crystals) are correlated. The differential scattering cross section for elastic scattering for unpolarized x-rays at momentum transfer x is commonly expressed as $$d\sigma_E/d\Omega=0.5r^2_e(1+\cos^2\theta)FF(x), \tag{3}$$

where $r_e=2.82\times10^{-13}$ cm is the classical electron radius, and x is related to the energy $E_x$ and scattering angle θ by $$x=(E/hc)\sin(\theta/2), \tag{4}$$

where hc=12.4 keV-A°. The form factor FF(x) expresses interference effects in the scattering process, being essentially the Fourier transform of the scatter's electron density function. For crystalline materials FF(x) can be computed, for non-crystalline materials it must be measured. It is important to note that x-rays of different energy can transfer the same momentum value x by scattering at different angles θ. FIG. 1. also shows the elastic scattering cross section $\sigma_E(E)$ 5 in Fe. As shown, $\sigma_E(E)$ varies more strongly with x-ray energy E than $\sigma_C(E)$ but not so strongly as $\sigma_{PE}(E)$.

3: Brief Survey of Existing Art

The field of x-ray detection is highly developed. A fairly comprehensive introduction to the state of the art may be found in the volume "Radiation Detection and Measurement, $2^{nd}$ Ed." by Glenn F. Knoll (J. Wiley, New York, 1989). However, when one wishes to determine the energy spectrum of a source, there are basically three common approaches plus one proprietary method.

3.1 Bragg Scattering Approaches

The first common approach is to use a Bragg diffracting crystal scattering at angle 2θ to measure the source flux at a single energy E(θ) given by the Bragg condition $$E(\theta)=nhc/(2d\sin(\theta)). \tag{5}$$

The measurement is repeated for as many θ values as desired, allowing the source spectrum to be mapped out.

While this approach has excellent energy resolution, it is extremely tedious due to the number of measurements which must be made. In a variation of this approach, Deslattes (U.S. Pat. No. 5,381,458) used a curved crystal to diffract an entire spectrum onto a linear detector simultaneously. While this approach is fast, the instrument itself is often too bulky, difficult to align, and fragile for routine applications.

3.2 Energy Dispersive Detectors

The second common approach is to use solid state, energy dispersive detectors. These devices have poorer energy resolution than the foregoing (100s of eV rather than eV) but it is often adequate for calibration purposes and they are capable of acquiring a complete spectrum at once. Their major limitation for measuring sources is their limited count rate capability, typically less than 200,000 counts/sec. By comparison, a typical mammography source produces approximately $10^8$ x-rays/sec/mm$^2$ at its working distance of 60 cm. As a result, the only way solid state detectors can be used to calibrate sources is at long measurement distances, using the $1/r^2$ law to attenuate the source. Since these distances can be considerable (10's of meters) and the flight paths must be evacuated, this approach is not suitable for routine measurements.

3.3 Source Filtering

The third common approach has been to measure the source through a set of two or more filters, either sequentially with the same detector or in parallel with multiple detectors. (See as examples U.S. Pat. Nos. 4,935,950, 4,697,280, 4,189,645, and 4,355,230.) These systems can typically measure only a single or small number of characteristics of the source spectrum, for example its high energy cutoff (kVp value) or a weighted mean energy (e.g. half value layer) unless a very large number of filters is used. Even so, attainable energy resolution is very poor, perhaps a few keV. The following brief example will clarify the problems which arise when an x-ray source is attenuated by filtering and/or scattering.

FIG. 2A shows the output spectrum from a molybdenum (Mo) x-ray tube, 7 in a typical mammography machine, as calculated from the semiempirical model of Tucker et al. "Molybdenum target x-ray spectra: A semiempirical model", Medical Physics, Vol. 18, pp. 402–407 (1991) for an exposure of 200 mAs and a peak excitation voltage, $kV_p$, of 30 kV. At 60 cm, this system delivers about $1.2\times10^8$ photons/sec into a 1 mm$^2$ area, which is more than 1000 times the rate capability of a high speed solid state detector. We have attempted reducing the total count rate using a 50 $\mu$m pinhole, but discovered two problems. First the 40/1 aspect ratio of the "pinhole" in 2 mm Ta made it difficult to reliably align pointing toward the source. Second, the high local flux density was found to cause electrical damage in the contacts to some of our x-ray detectors.

FIG. 2B shows the effect of reducing the spectrum's intensity 1000-fold by attenuation through a 385 $\mu$m Fe foil. As may be seen, the entire spectrum 8 is hugely distorted, with the low energy end attenuated beyond recovery.

FIG. 2C shows the effect of attenuating the spectrum by scattering at 90° 9 from a piece of iron into a 0.01 steradian solid angle. The small solid angle was chosen to minimize the variance in Compton energy loss with scattering angle. This approach has several problems. First, the elastic scattering has the Compton scattering overlaid on it on a shifted energy and non-linear energy scale, giving two pairs of lines, etc. Second, the scattering is too weak from the modeled solid acceptance angle: the flux is reduced by $10^5$. Third, the spectrum is still considerably distorted by the energy dependencies of both scattering processes. Further, if a larger solid angle were used to get more flux, then the Compton spectrum would become considerably smeared by the range of allowed scattering angles and Fe fluorescence from the foil would also become important, introducing spurious K-line peaks into the spectrum near 6 keV.

These figures therefore illustrate the typical problems encountered when scattering or attenuation are used to reduce x-ray intensity.

3.4 A Proprietary Compton Scattering Approach

RTI Electronics AB of Sweden has produced an instrument using the method of FIG. 2C with a low Z scatterer. The details of the method have been published by Matscheko and Ribberfors in Physics Medical Biology, Vol. 34, pp. 835–841 (1989) and Vol. 32, pp. 577–594 (1987). A tiny range of scattering angles centered about 90° is used between the source and an energy dispersive detector. Since the energy loss on Compton scattering at a fixed angle is given by Eqn. 2, then, given a very small range of scattering angles, they can mathematically reconstruct the original spectrum from the observed spectrum. The necessarily small range of acceptance angles means that it requires 20 seconds or more to acquire a spectrum, which can exceed the allowable on-times for high power x-ray tubes. The commercial apparatus, with its carefully aligned collimators, is also bulky and expensive.

3.5 Synopsis

From the foregoing it is clear that, in many applications, it would be quite advantageous if x-ray beams could be attenuated by several orders of magnitude without introducing significant spectral distortion. The availability of such an attenuator would then allow solid state detectors to be used effectively in source spectral measurements and facilitate the development of compact portable instruments for calibrating x-ray sources in medical application such as mammography and elsewhere.

SUMMARY OF THE INVENTION

The present invention provides techniques for attenuating a beam of x-rays by several orders of magnitude without introducing spectral distortions within a fairly wide band of energy values. The degree of attenuation and width of the energy band can both be controlled by the details of the design.

In brief, the present invention contemplates creating x-ray attenuators by employing small angle, forward scattering from a volume of material whose thickness varies with position and where the thicknesses of specific regions of the material are adjusted to compensate for the inherent energy dependence of the forward scattering process.

A method according to an embodiment of the invention for reducing, by a factor that is uniform to a desired degree for all energies in a selected energy range ΔE, the flux of x-rays impinging on a selected area from an x-ray source, includes preventing the area from being directly irradiated by the source, placing a scattering body of x-ray scattering material between the source and the area so that only by scattering from the scattering body over an angular range of scattering angles can x-rays from the source reach the area, and restricting the angular range to a limited range of small, forward scattering angles. This is accomplished by configuring the scattering body to have a thickness that has a functional dependence on position such that the scattering efficiency into the area A is uniform to the desired degree for all x-ray energies within the energy range ΔE. In this context, the thickness is measured in a direction parallel to an axis running from the center of the source to the center of the area.

An attenuator (or filter element) according to an embodiment of the invention includes a mechanism, such as an x-ray absorber, for preventing the area from being directly irradiated by the source, a scattering body of x-ray scattering material between the source and the area so that only x-rays scattered in the scattering body over an angular range of scattering angles reach the area, and a mechanism, such as x-ray absorbing material, for restricting the angular range of scattering angles so that only by forward scattering through a limited range of small angles in the scattering body can any x-rays reach the area from the source. The need for absorbers can be obviated by suitable orientation and design of the source. The scattering body is configured with its thickness having a functional dependence on transverse position such that the scattering efficiency into the area at all x-ray energies within the energy range $\Delta E$ is uniform to the desired degree.

In one set of embodiments, x-rays from the source that are not scattered are prevented from reaching the detector by a first x-ray absorber disposed along the line of sight, and a second x-ray absorber disposed off the line of sight to restrict the angular range of scattering angles to a desired limited range of small angles. In other embodiments, the source is configured to avoid the need for one or both absorbers. For example, the source can be configured or oriented so that no x-rays are emitted along the line of sight to the detector. Also, the source can be configured or oriented so that no x-rays at large scattering angles reach the detector.

More specifically, one particular embodiment consists of a radially symmetric piece of plastic of maximum radius Ro having thickness L(r) as a function of radius r and a central absorbing core of radius $R_i$ to prevent direct x-ray transmission between an x-ray source placed on one side of the attenuator and an x-ray detector placed on the other. For small angle scattering at a constant value of momentum transfer x, (see Eqn. 4) chosen to correspond to a maximum in the plastic's form factor, x-ray energy will vary essentially as 1/r. Thus high energy x-rays will scatter at smaller $\theta$ values closer to $R_i$, while low energy x-rays will scatter at larger $\theta$ values closer to $R_o$. Since the differential scattering volume at radius r is $2\pi rL(r)dr$, L(r) can be adjusted so that the product of scattering volume and scattering efficiency is constant as a function of x-ray energy. Thus L(r) is made thicker near $R_i$, where r is small but $E_x$ is large and weakly attenuated, and thinner near $R_o$, where r is large but $E_x$ is small and strongly attenuated. By this approach a simple Rexolite scatterer 15 mm in radius with a 2.50 mm radius absorbing core can be designed whose attenuation is uniform within 3% from 10 to 36 keV using only three thicknesses of material: 8 mm for 2.50 mm $<=$r $<$5.00 mm, 2 mm for 5.00 mm $<=$r $<$6.25 mm, and 1 mm at larger radii. Higher degrees of uniformity can be attained by using continuous functions L(r).

A further understanding of the nature and advantages of the present invention may be realized by reference to the remaining portions of the specification and the drawings.

DESCRIPTION OF SPECIFIC EMBODIMENTS

4: Overview of the Method

Figure 3:
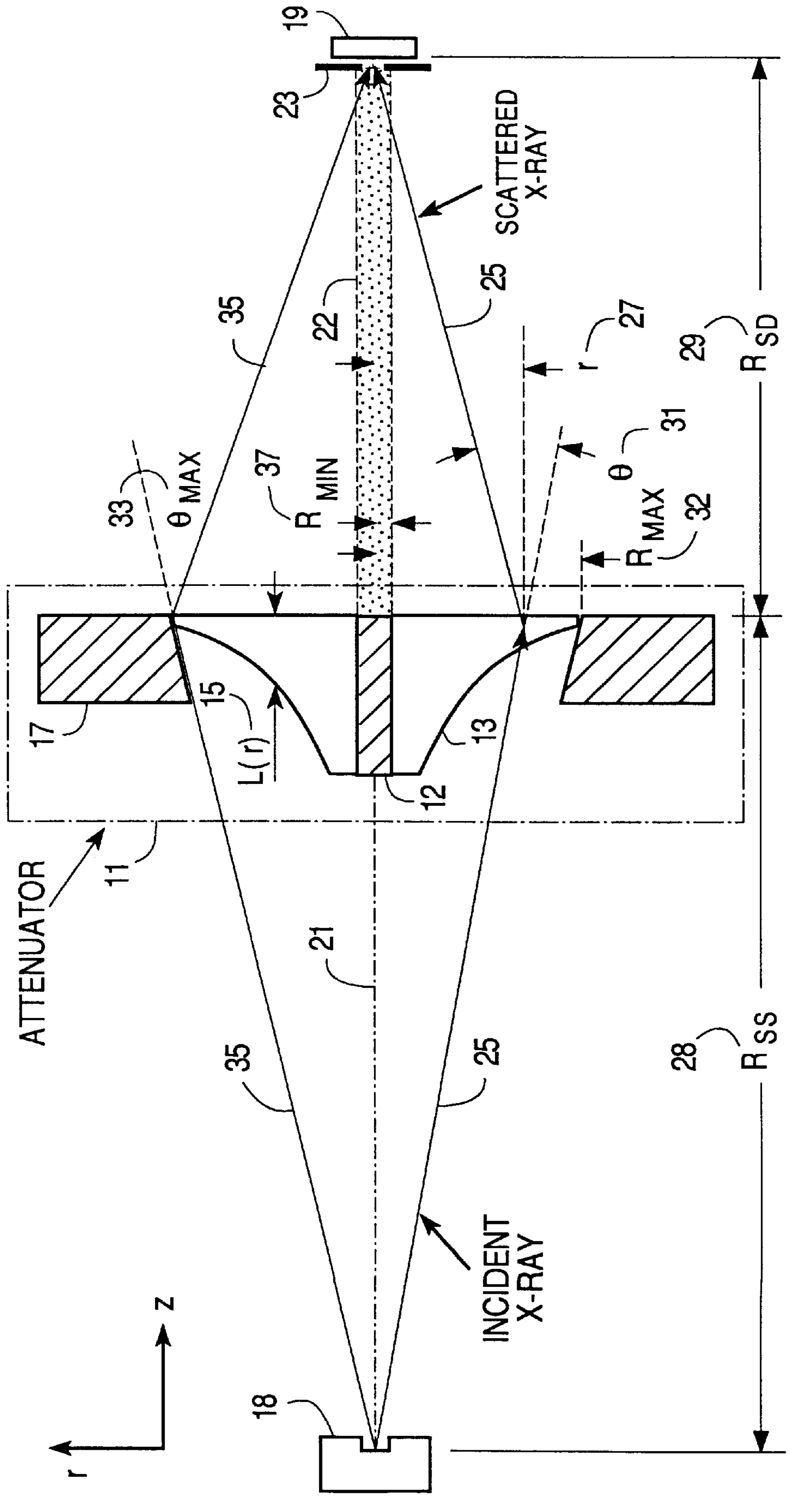
FIG. 3 shows a generic design of the invention attenuator.

FIG. 3 shows an embodiment 11 of the invention attenuator. For the purposes of explication, this embodiment has radial symmetry, although, as will be shown later in the specification, such symmetry is only a simplification and not a necessary part of the invention. The attenuator comprises three components, a central absorbing core 12, a scattering body 13 whose radial profile is L(R) 15, and a surrounding support 17, which also functions as a collimator.

In practice, the attenuator 11 is positioned between an x-ray source 18 and an x-ray detector 19 in such a way that the absorbing core 12 blocks the detector's direct view of the source 18, so that the detector can only receive x-rays scattered through the profiled scattering body 13. This is typically accomplished by placing the axis of the absorbing core 12 on the line 21 directly connecting the source 18 and the detector 19. FIG. 3 shows the shadow 22 cast by the core 12, with the detector 19 lying within its umbra. If necessary, an aperture 23 may be placed in front of the detector 19 to define the detector's acceptance accurately.

When an x-ray 25 scatters in the scattering body 13 at a given radius R 27, then R, together with the source to scatterer distance $R_{SS}$ 28 and the scatterer to detector distance $R_{SD}$ 29, determine the scattering angle $\theta$ 31. The maximum scatterer radius $R_{MAX}$ 32 similarly determines the maximum scattering angle $\theta_{MAX}$ 33 through which an x-ray 37 can scatter and still reach the detector 19. $R_{MAX}$ may be set by the construction of either the scattering body 13 or the surrounding support 17. In like manner, the radius $R_{MIN}$ 37 of the core 12 determines the minimum scattering angle allowed.

In specific embodiments of the invention attenuator, $\theta$ is typically restricted to some maximum value $\theta_{MAX}$ 33 in order to achieve improved performance, both by allowing the use of scattering materials with enhanced small angle scattering, as will be further described below, and by limiting spectral distortions arising from Compton scattering. The latter effect arises from two sources. First, elastic scattering is enhanced in the forward direction, while Compton scattering falls off, which effectively improves signal to noise. Second, from Eqn. 2, the Compton energy loss $\Delta E$ at small scattering angles $\theta$ goes as:

$$\Delta E=E(1-[1+\alpha(1-\cos\theta)]^{-1})\alpha\theta^2E/2, \quad (6)$$

where $\alpha=E/m_ec^2$. Thus the maximum energy lost by Compton scattered x-rays (i.e., spectral distortion) can be strictly limited by the value of $\theta_{MAX}$ 33. For example, for E=40 keV and $\theta$=20°, the maximum energy loss is $\Delta E$=190 eV, which would be acceptable in mammographic calibration applications. Compton scattering can therefore be effectively eliminated as a spectral distortion mechanism in any particular case by selecting an appropriate value of θMAX.

Figure 1:
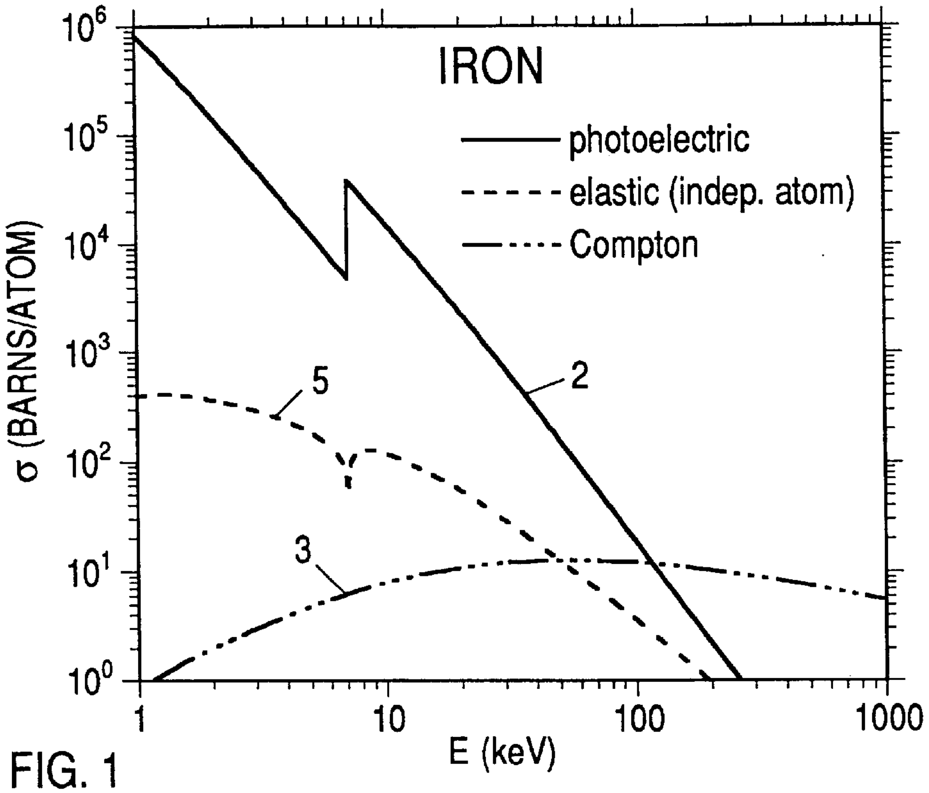
FIG. 1 shows Compton, elastic scattering and photoelectric absorption cross sections for iron as a function of energy.
Figure 2A:
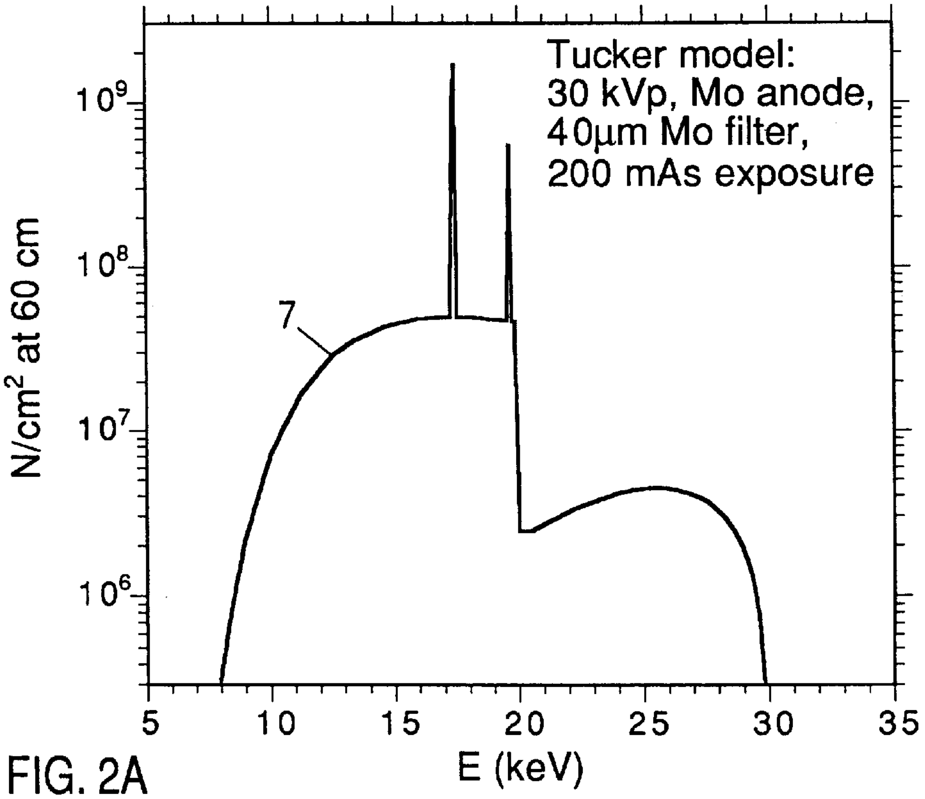
FIG. 2A shows the modeled x-ray spectrum output by a mammography x-ray tube under typical operating conditions.
Figure 2B:
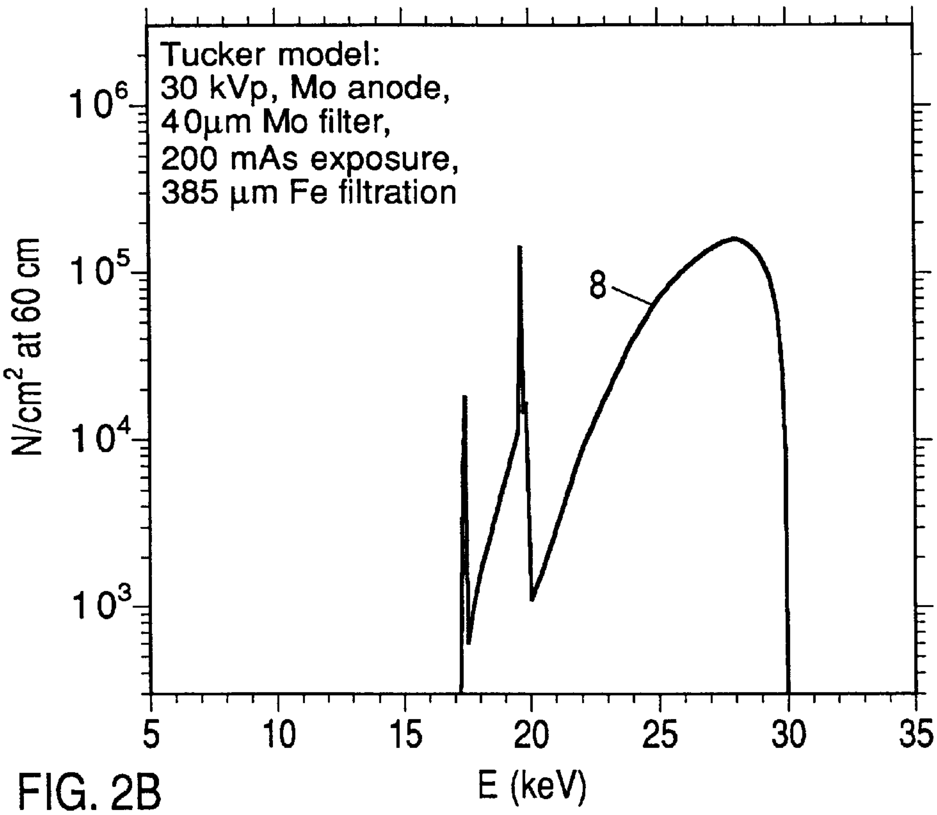
FIG. 2B shows the same spectrum attenuated 1000-fold by an iron filter 385 microns thick.
Figure 2C:
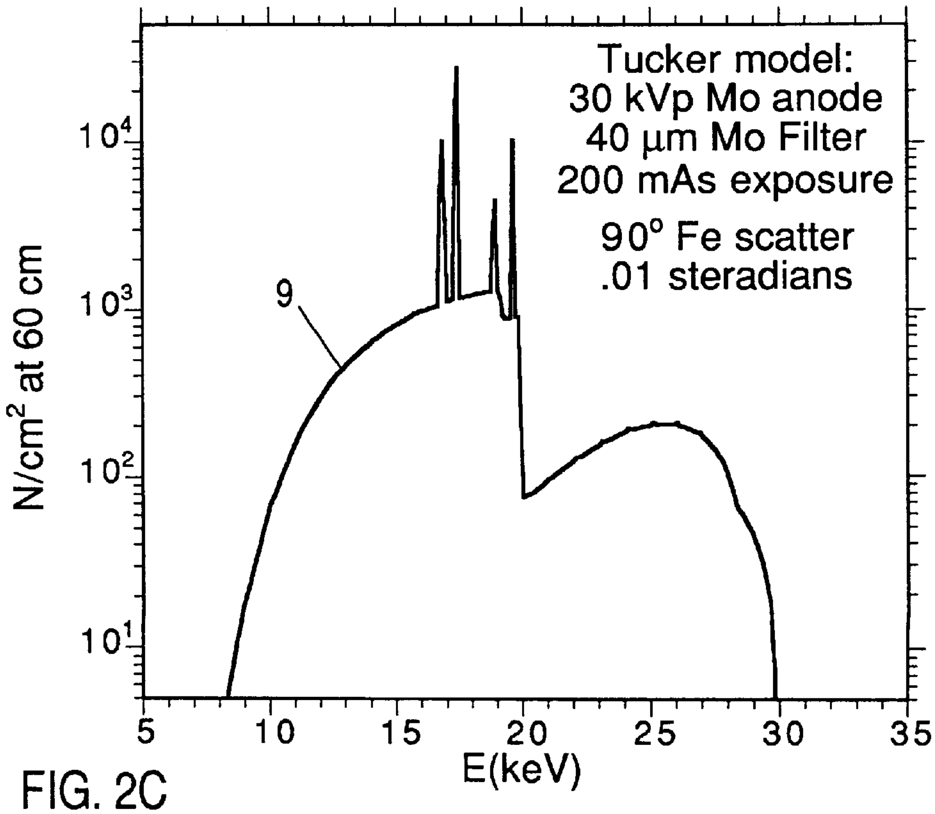
FIG. 2C shows the same spectrum scattered at 90 degrees by a thick iron foil.

To further elucidate this approach, we consider carbon, which has a high elastic scattering to photoelectric absorption ratio and is a major component in many commonly available materials (e.g. plastics). We have selected a low Z material because, while the ratio of elastic to Compton scattering scales like $Z^2/Z$ and worsens at low Z, the ratio of elastic scattering to photoelectric absorption scales like $Z^2/Z^4$ and improves far more rapidly. This is a beneficial tradeoff since working at small θ allows us to ignore the effects of Compton scattering while working with low photoelectric absorption allows us to avoid spectral distortions of the type shown in FIG. 2B.

Figure 4:
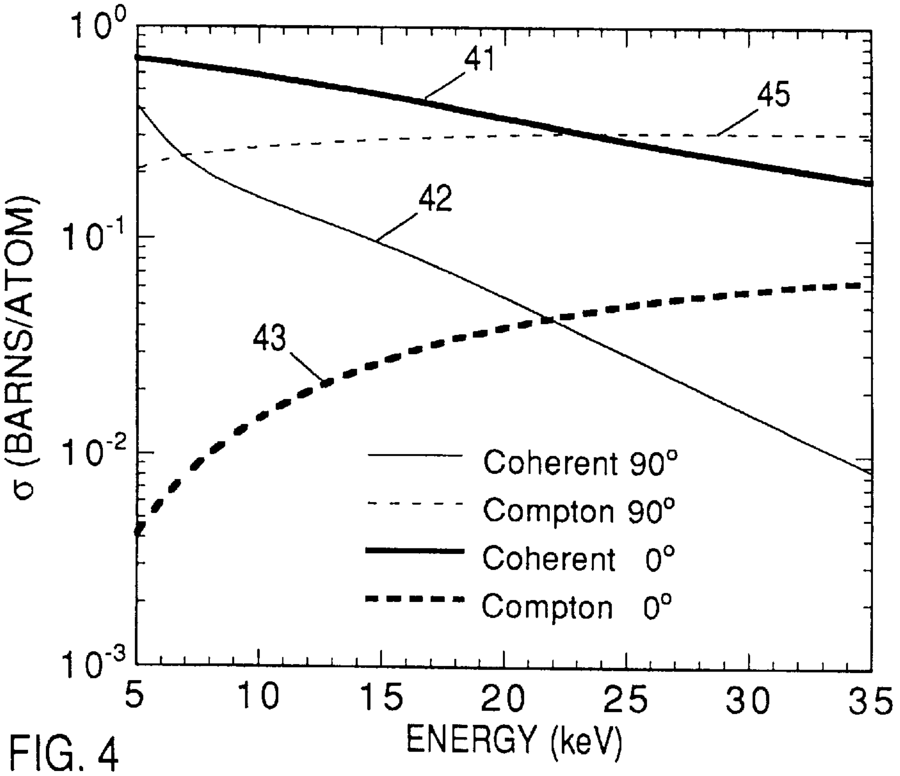
FIG. 4 compares elastic and Compton scattering cross sections in carbon in the forward and 90 degree directions.

FIG. 4 shows the benefit gained between 5 and 35 keV by working in the forward scattering direction, compared to the 90° scattering direction discussed earlier. These curves were derived from standard Photon Data Library tables (See Lawrence Livermore National Laboratory Report #UCRL-50400, 1989, by D. E. Cullen, et al.) in the independent atom approximation, which only considers intra-atomic coherence effects. Both cases subtend 0.27 steradians solid angle (16.8° maximum scattering angle θ) centered about 0° and 90°, respectively. The small angle case is superior to 90° case in three significant ways. First, elastic yield at 0° (curve 41) is increased by factors of 4 to 40 between 10 and 35 keV compared to the yield at 90° (curve 42). Second, the elastic yield is less energy dependent, varying by only a factor of 3 between 10 and 35 keV, compared to a factor of 20 at 90°. Third, Compton scattering at 0° (curve 43) reduced by factors of 18 to 5 between 10 and 35 keV compared to the Compton yield at 90° (curve 45). As a result, elastic scattering dominates in the forward scattering case while Compton scattering dominates at 90°. Further, at 90° a 40 keV Compton scattered photon loses 3.9 keV (960 eV at 20 keV), compared to only 190 eV at 20°. The method is therefore doubly advantageous, both because it greatly increases the relative elastic yield and also because it allows Compton energy losses to be arbitrarily limited.

5: Attenuator Design

The x-ray source 18 can be generally characterized by its spectrum $S_i(E,\Omega)$, which is the number of x-rays of energy E emitted per second into solid angle Ω. In the following we shall, for simplicity, neglect any Ω dependence and assume an isotropic source $S_i$ (E). The extension to the more general case will not be difficult to those skilled in x-ray physics. Noting that scattering depends only on the angle θ, we can then write the following, single scattering approximation for Y(E), the yield, of x-rays scattered from source 18 into detector 19 by the scattering body 13 at energy E:

$$Y(E) = \frac{N_0}{A}\int_{R_{MIN}}^{R_{MAX}} 2\pi r d r \int_0^{L(r)} \frac{d\sigma^{scat}(E,\theta)}{d\Omega} P(r,z)\Delta\Omega(r,z) d z. \tag{7}$$

Here $n_0$ is the number of scatterers per unit volume, A is the area of the scattering body 13, and $d\sigma^{scat}/d\Omega$ is the differential cross section per scatterer in the material composing the scattering body 13. The volume integral over the scattering body has been explicitly divided into one integral are over the scattering body's radius, between the limits $R_{MIN}$ 37 and $R_{MAX}$ 32, and a second integral over the scatterer's z profile L(r). ΔΩ is the solid angle subtended by the detector 19, viewed from location (r,z) in the scatterer. The product $n_0\, d\sigma^{scat}/d\Omega$ is the probability per unit volume of scattering an x-ray from the source 18 into the detector 19. P(r,z) is the cumulative probability that the x-ray can penetrate to (r,z) from the source 18 and then exit the attenuator in the direction of the detector 19 without further scattering or being absorbed. Because we are constructing an attenuator with very low overall yield, the use of this single scattering approximation, i.e., that the scattering event at (r,z) represented by $d\sigma^{scat}/d\Omega$ is the x-ray's only interaction that redirects it toward the detector, will be sufficiently accurate for the present demonstration.

The scattering cross section $d\sigma^{scat}/d\Omega$ is, in general, the sum of both the elastic and Compton terms (i.e., $d\sigma^{scat}/d\Omega = d\sigma^{comp}/d\Omega + d\sigma^{elast}/d\Omega$). However, since we have shown in FIG. 4 that the Compton terms are small for forward scattering, we shall only consider the elastic cross section (Eqn. 3) in order to more clearly convey the essence of the approach. Extending Eqn. 7 to the more general case, which does not possess radial symmetry is straightforward, resulting in $$Y(E) = \frac{N_0}{A}\int_A d x d y \int_0^{L(x,y)} \frac{d\sigma^{scat}(E,\theta)}{d\Omega} P(x,y,z)\Delta\Omega(x,y,z) d z, \tag{8}$$

where the integral over radius R in Eqn. 7 has been replaced by a 2-dimensional integral over the generalized area A of the scatterer, whose thickness is L(x,y) at each location (x,y). Extending Eqn. 8 to include single Compton scattering, will not be difficult to treat for those skilled in x-ray physics since it only requires adding an additional expression of the form of Eqn. 8 containing $d\sigma^{comp}/d\Omega$. Including multiple scattering events is a more complex problem but can be handled, for example, by Monte Carlo photon transport codes.

The spectrum $S_m(E)$ measured by the detector, excluding detector imperfections, will then be given by:

$$S_m(E) = Y(E)\, S_i(E), \tag{9}$$

and our goal is to find a profile L(r) 15 for the scattering body 13 which causes Y(E) to become a small constant which is effectively independent of E. By accomplishing this, we can create an attenuator which does not distort the input spectrum $S_i(E)$. Thus $S_m(E)$ will be an accurate representation of $S_i(E)$ and will not require any further mathematical processing.

Figure 5:
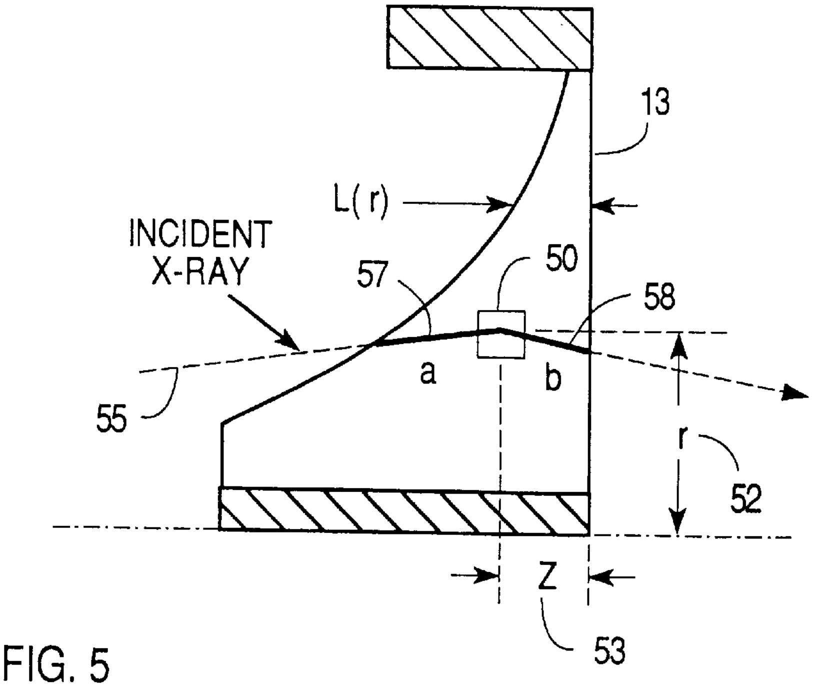
FIG. 5 shows an enlarged view of scattering in the invention attenuator.

We can develop the several terms in Eqn. 7 by reference to FIG. 5, which shows an expanded section of the scattering body 13. ΔΩ(r,z) is the solid angle subtended by the detector 19 as seen from the scattering volume drdz 50 located at radius r 52 and height z 53 within scattering body 13. P(r,z) is the cumulative probability that an incident x-ray 55 of energy E can penetrate scattering body 13 to the differential volume 50 along entrance path a 57 and, having scattered there, exit scattering body 13 along exit path b 58 without suffering any additional scattering or absorption events. If μ(E) is the material's total absorption length (including both scattering and absorption) then it is well known that P(r,z) can be written as:

$$P(r,z) = \exp(-M(r,z)\mu(E)), \tag{10}$$

where, from FIG. 5, M(r,z) is the sum of the path lengths "a" and "b," denoted 57 and 58. dσ/dΩ will be given by Eqn. 3, where FF(x), as noted earlier is a function of the structure of the scatterer 13's material. Depending upon the form of FF(x), Eqn. 7 may be performed by analytic or numerical means or else by Monte Carlo modeling. Once the means to compute Eqn. 7 have been developed, then L(r) can be adjusted iteratively or by various other approaches to minimize the energy dependence of Y(E). We will not discuss methods for optimizing L(r) in any detail since our invention lies not in any particular approach for doing so but, more generally, in recognizing that, given a scattering function FF(x) for a particular material, it is possible to use Eqn. 7 and its more generalized counterparts to find a set of profiles L(r) which produce constant values of Y(E) over some range of E values. We will present an example in Section 7.

6: Enhanced Small Angle Scattering

Because of limitations imposed by the relative cross sections for photoelectric absorption, elastic scattering and Compton scattering found in materials in nature, it is not possible to design scatterers which obtain arbitrarily large values of Y(E). Arbitrarily small values can be obtained, of course by reducing both the area of the scatterer and its thickness (i.e., reducing the available volume of scattering material). Obtaining relatively large values of Y(E), when it is desirable to do so, requires some sophistication in choosing the scattering material.

Knowing that $\theta_{MAX}$ will be limited to small angles, in order to minimize Compton energy shifts (as per the discussion of Section 4 above) we will be therefore be interested in materials which display enhanced small angle scattering. It is well known that, while the total elastic scattering from a material is just equal to the product of the number of atoms times their atomic scattering factors, how that scattering is distributed as a function of momentum transfer x depends upon the molecular or crystalline structure of the scattering material. In particular, the x of maximum scattering typically scales inversely with the dimension of the material's molecular structures. For this reason, plastics composed of large polymer chains often display enhanced small angle scattering. Various natural materials, including minerals and substances of biological origin, and other manmade materials, including ceramics, glasses and metallic alloys, can also show enhanced small angle scattering. We selected plastics, as a class, for development work since they possess the following advantages: low average atomic number, ready and reproducible availability, and ease of forming to nearly arbitrary shapes.

Figure 6:
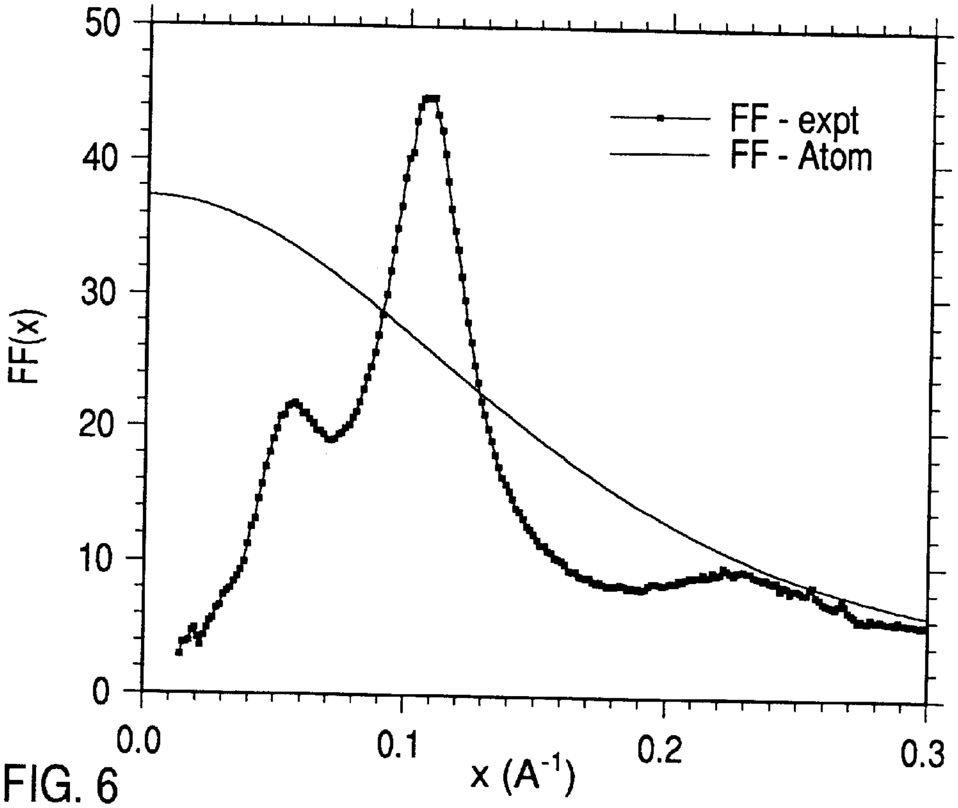
FIG. 6 shows the scattering form factor for Rexolite.
Figure 7:
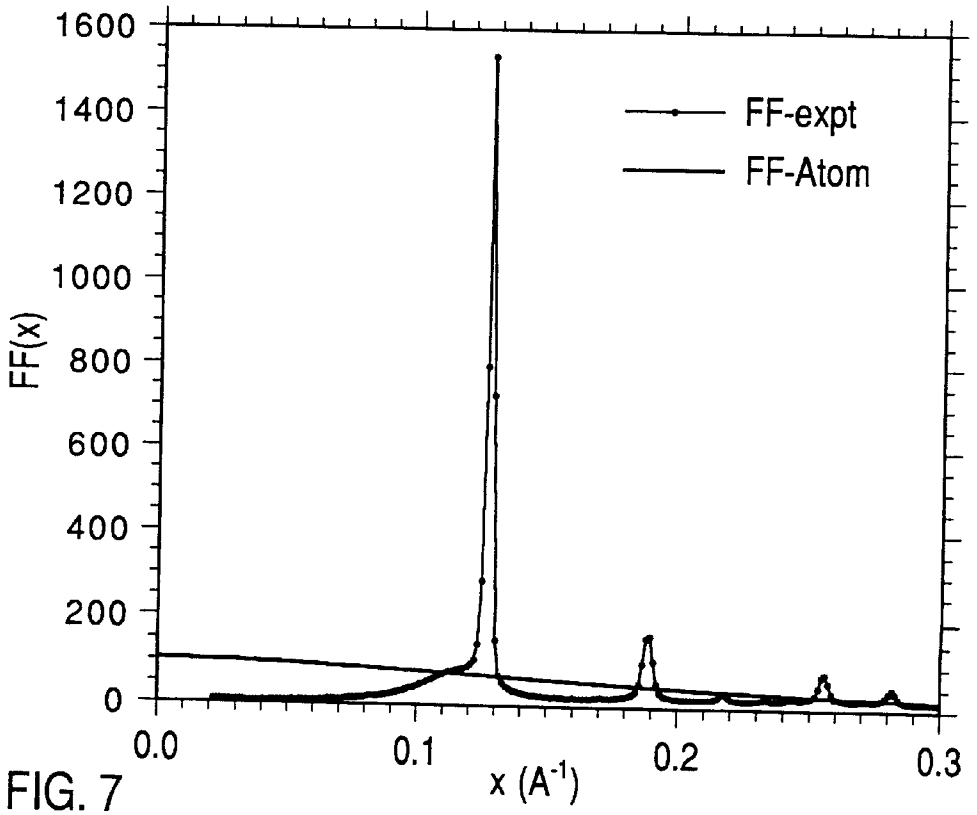
FIG. 7 shows the scattering form factor for Delrin.

Using an x-ray diffractometer, we measured FF(x) for 14 common plastics and selected Rexclite and Delrin as particularly promising materials. FIG. 6 shows the form function FF(x) from Rexolite, an amorphous plastic, while FIG. 7 shows FF(x) from Delrin, a crystalline plastic. The latter shows the sharp peaks characteristic of crystalline materials, while the former shows a more diffuse peak characteristic of an amorphous material. While the crystalline peak is much higher than the amorphous peak, Rexolite is still a competitive scatterer, both because its peak is broader and its absorption coefficient is much smaller. Between these two, we selected Rexolite for initially constructing attenuators because it is radiation resistant, holding its dimensions well with dose. Its FF(x) curve was then used in Eqn. 3 to generate $d\sigma^{scat}/d\Omega$ for Rexolite in constructing the attenuator described in the next section.

7: Simple Optimized Attenuator Structure

Figure 8A:
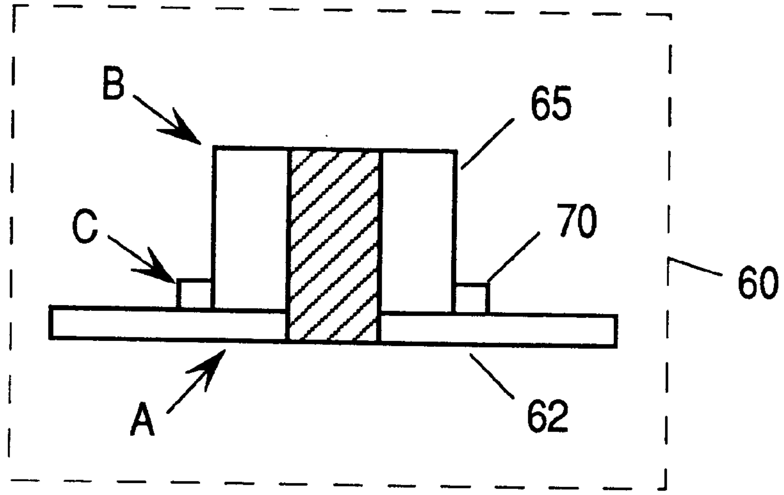
FIG. 8A shows the geometry of the scatterer which produces the curves shown in FIG. 8.
Figure 8B:
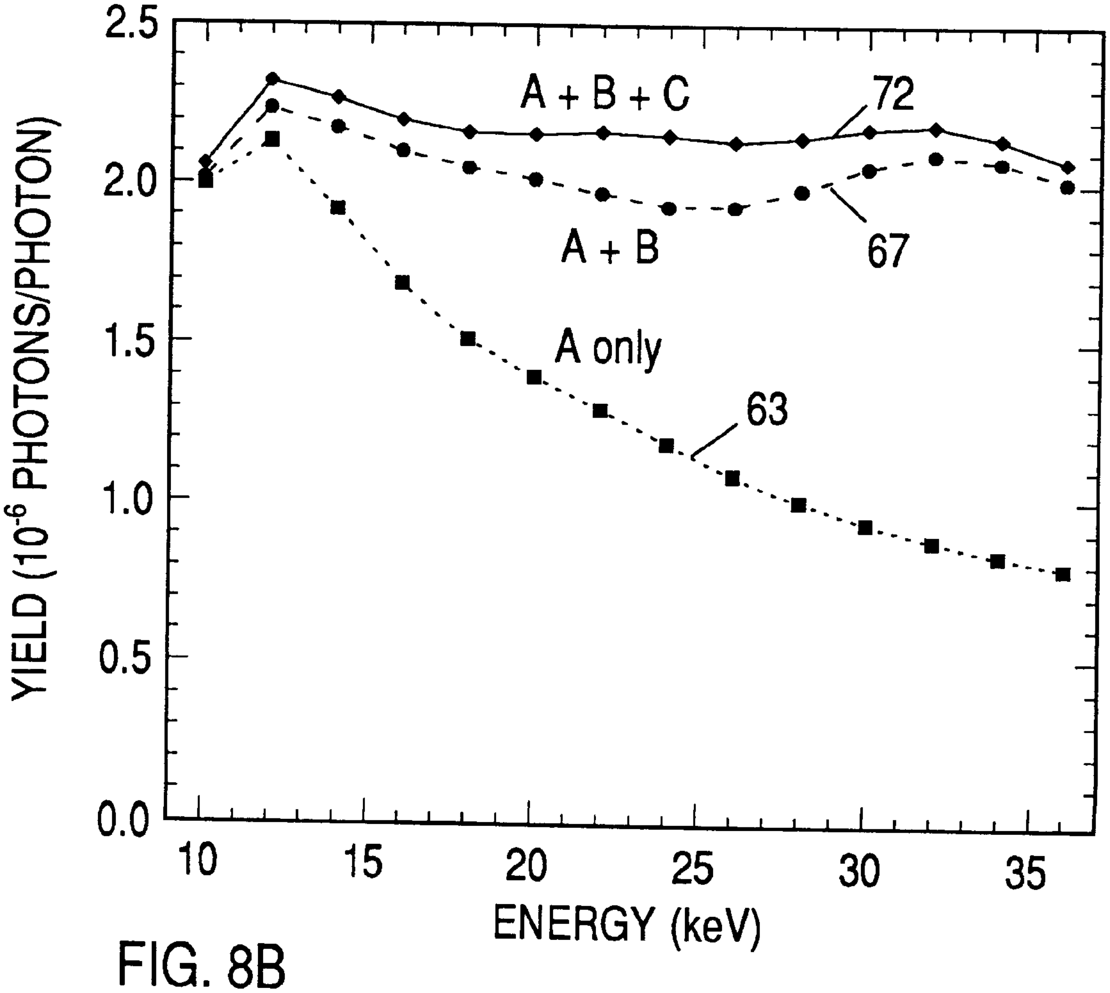
FIG. 8B shows the x-ray yield from a simple invention attenuator geometry as a function of x-ray energy.

In this example, we investigate a simple class of scatterers, which we have termed "ziggurats" since the profiles of our early designs resembled the Babylonian temples of that name. Some of these were measured for comparison to calculations and agreed quite well, justifying our use of the single scattering model. Once we had become familiar with their properties, we developed a program to search for ziggurat profiles which would produce flat Y(E) curves. For the purposes of the search, a 15 mm radius ziggurat was divided radially into 10 cylinders, excluding a 2.5 mm radius absorbing core, and each cylinder was allowed to assume 10 possible height values, in steps of 1 mm. By requiring that each cylinder's height be less than or equal to those of lesser diameter, the total number of possibilities was reduced to about $10^5$. The yield Y(E) from each combination was computed using Eqn. 7, and its percent deviation from its mean computed. Those having deviations of less than 10% (about 10) were then plotted and examined further. FIG. 8A shows the best ziggurat 60 found by this procedure. The rms deviation of its yield from flatness is less than 3% between 10 and 36 keV and it comprise only three cylinders. This ziggurat's yield and the contributions from its three cylinders are illustrated by the curves in FIG. 8B. The 1 mm thick disk A 62 scatters effectively at low energies, as shown by the A "only" curve 63. Adding the 8 mm thick by 5 mm radius thick-walled central tube B 65 enhances the scattering at higher energies, as shown by the "A+B" curve 67. The dip between 20 and 25 keV is then tweaked up using the collar C 70, which is only 1 mm in height and 1.25 mm in annular radius, to achieve the final Y(E) rms flatness value of 3% shown in the "A+B+C" curve 72. Looking at the final Y(E) "A+B+C" curve 72 and the magnitudes of the changes introduced by each of the additional cylinders of material, it is quite clear that, by including finer gradations in both radius and height, starting from this design, we could easily generate a Y(E) curve that would be flat to better than 1% rms. This would allow undistorted energy spectra to be collected directly via Eqn. 9.

Figure 9:
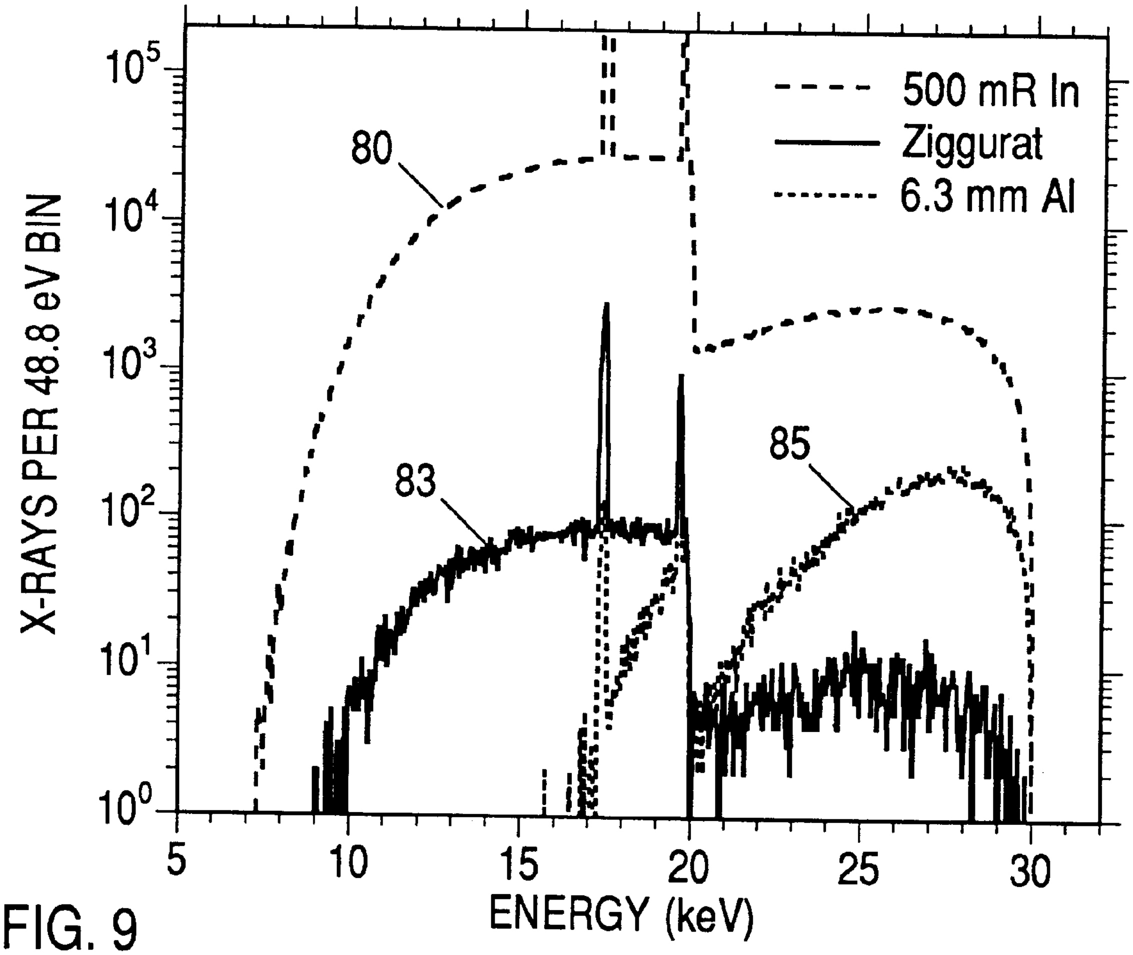
FIG. 9 shows the spectrum of FIG. 2A attenuated by the structure of FIG. 8B and also attenuated by 6.3 mm of Al.

FIG. 9 shows Monte Carlo spectra demonstrating flux reduction using the optimized ziggurat 60 shown in FIG. 8A. The input flux curve 80 for a 500 mR exposure at 60 cm from a mammographic x-ray generator comprising a Mo tube operated at 30 kVp and filtered by 40 $\mu$m of Mo plus a 3 mm thick polycarbonate compression paddle was thrown by a Monte Carlo modeling program using the Tucker model referred to earlier. In this model a 0.4536 $mm^2$ detector area was used, corresponding to a 0.76 mm diameter detector mask 27. The total number of counts is 7.7×106. Two additional distributions were also thrown with the same number of starting counts. In the first curve 83, the ziggurat 60 of FIG. 8A was located 5 cm from the same detector, which produced 23,400 counts, a reduction factor of about 300. In the second curve 85, a 6.3 mm piece of Al replaced the ziggurat to also produce 23,400 counts (whence the choice 6.3 mm). The effects of counting statistics are readily seen in both these curves. Similarly to the Fe filter case shown in FIG. 2B above, the use of the Al filter clearly makes spectral recovery impossible below 16 keV and grossly distorts the spectrum at higher energies by over an order of magnitude. The ziggurat, on the other hand, uniformly reduces the source intensity from 10 to 35 keV. The 3% deviations from uniformity expected the "A+B+C" yield curve in FIG. 8B cannot be seen in FIG. 9, which is plotted using a log scale.

Thus, with this specific implementation, we have shown how to use Eqn. 9 to design a Rexolite attenuator which, between 10 and 35 keV, reduces the flux of an x-ray source by a factor of about 300 with a uniformity of 3%. We have also shown, by the design process, how to further modify the design to achieve higher degrees of uniformity. Comparing the spectral distortions introduced by filtering (factors of 10 or more at lower energies) to those introduced by the invention method (order 0.03 or less), it is clear that highly accurate spectra can now be directly measured and the necessity of performing complex corrections of uncertain accuracy thereby avoided.

8: References Cited

The following patents, and references therein, refer to various methods for calibrating mammography machine or other x-ray or gamma-ray sources and may be relevant to the present invention.

| | | | |
|---|---|---|---|
| 3,752,986 | 8/1973 | Fletcher et al. | 250/394 |
| 4,189,645 | 2/1980 | Chaney et al. | 250/394 |
| 4,355,230 | 10/1982 | Wilson et al. | 250/252.1 |
| 4,442,496 | 4/1984 | Simon et al. | 364/524 |
| 4,697,280 | 9/1987 | Zarnstorff et al. | 378/207 |
| 4,916,727 | 4/1990 | Sheridan | 378/207 |
| 4,935,950 | 6/1990 | Ranallo et al. | 378/207 |
| 5,381,458 | 1/1995 | Deslattes | 378/207 |

Cullen, D. E., et al., "Photon Data Library" (Lawrence Livermore National Laboratory Report #UCRL-50400, 1989).

Guinier, A., "X-ray Diffraction in Crystals, Imperfect Crystals, and Amorphous Bodies" (W. H. Freeman, San Francisco, 1963).

James, R. W., "The Optical Principles of the Diffraction of X-rays" (Oxbow Press, Woodbridge, Conn., 1982).

Heitler, W., "The Quantum Theory of Radiation", $3^{rd}$. ed. (Oxford University Press, Oxford, 1954).

Matscheko, G. & Ribberfors, R., "A generalized algorithm for spectral reconstruction in Compton spectroscopy with corrections for coherent scattering", Physics Medical Biology, Vol. 34, pp. 835–841 (1989). Also: "A Compton scattering spectrometer for determining x-ray photon energy spectra", Physics Medical Biology, Vol. 32, pp. 577–594 (1987).

Knoll, G. F., "Radiation Detection and Measurement, $2^{nd}$ Ed.", (J. Wiley, New York, 1989).

Platzman, P. & Tzoar, N., "Theory", Chapter 2 in *Compton Scattering*, ed. B. Williams (McGraw-Hill, New York, 1977).

Tucker et al., "Molybdenum target x-ray spectra: A semiempirical model", Medical Physics, Vol. 18, pp. 402–407 (1991)

Warren, B. E., "X-ray Diffraction" (Addison-Wesley, Menlo Park, Calif., 1969).

9: Conclusion

The foregoing description of a preferred embodiment has been presented for purposes of illustration and description. It is not intended to be exhaustive or to limit the invention to the precise form described, and obviously, many modifications and variations are possible in light of the above teaching. The embodiment was chosen and described in order to best explain the principles of the invention and its practical application to thereby enable others skilled in the art to best utilize the invention in various embodiments and with various modifications as are suited to the particular uses contemplated.

Further, while the above is a complete description of one specific embodiments of the invention, various modifications, alternative constructions, and equivalents may be used. For example, while the specific embodiment described has a discontinuous height profile L(r), being defined by a small number of cylindrical sections of fixed heights, L(r) could clearly also be a continuous function of r. Further, while the specific embodiment has a yield function Y(E) which is flat to 3% rms, we have demonstrated procedures which can be used to flatten Y(E) further or to extend its range of energy uniformity. In addition, while L(r) for the specific embodiment has radial symmetry, this is not a requirement of the method, as we have discussed. Further, there is no requirement that the scattering volume of the attenuator be made of a plastic, or even of a single scattering material. For one example, various phase separated ceramics and metals produce enhanced small angle scattering. For another example, a low Z material might be used at larger r values to produce efficient low energy scattering while a higher z material could be employed at smaller r values to enhance scattering at higher x-ray energies. Moreover, while centers of the x-ray source, attenuator, and detector were collinear in the specific embodiment, this is also not necessary to the operation of the invention. If an off-axis geometry were adopted, then, for example, the central absorbing core might be eliminated. Therefore, the above description should not be taken as limiting the scope of the invention as defined by the appended claims.

What is claimed is:

1. A method for reducing, by a factor that is uniform to a desired degree for all energies in a selected energy range ΔE, the flux of x-rays impinging on a selected area A from an x-ray source S, the method comprising:

preventing said area A from being directly irradiated by said source S;

placing a scattering body of x-ray scattering material between said source S and said area A so that only by scattering from said scattering body over an angular range R of scattering angles can x-rays from source S reach area A; and restricting the angular range R to a limited range of small, forward scattering angles;

wherein said scattering body is configured with a thickness L, the thickness L being measured in a direction parallel to an axis z running from the center of said source S to the center of said area A, the thickness L at a given position relative to said axis is a function of the given position, and said function is such that the scattering efficiency into said area A is uniform to the desired degree for all x-ray energies within said energy range ΔE.

2. The method of claim 1 wherein said area A is prevented from being directly irradiated by placing an x-ray absorber having an area at least commensurate with said area A in a direct line between said source S and said area A.

3. The method of claim 1 wherein said area A is prevented from being directly irradiated by restricting the angular range of x-rays emitted from said source S so that none of the x-rays emitted from said source S has a line of sight path to said area A so that only x-rays scattered by said scattering body reach said area A.

4. The method of claim 1 wherein said angular range of scattering angles is restricted by placing an x-ray absorber in a path that blocks x-rays that could scatter by an angle outside said angular range of scattering angles.

5. The method of claim 1 wherein said angular range of scattering angles is restricted by restricting the angular range of x-rays emitted from said source S.

6. The method of claim 1 wherein said scattering material displays enhanced elastic scattering at small angles.

7. The method of claim 1 wherein said scattering material is a polymeric plastic.

8. The method of claim 1 wherein said scattering material is a low Z material.

9. The method of claim 1 wherein said scattering body has radial symmetry about said axis.

10. The method of claim 9 wherein said scattering body has a stepped profile.

11. The method of claim 9 wherein said scattering body has a smooth profile.

12. The method of claim 1 wherein:

said scattering body is thin enough so that the majority of x-rays reaching said area A do so by only a single scattering interaction;

the thickness L is denoted L(x,y) where x and y are orthogonal coordinates transverse to said axis z;

the single scattering approximation is used to model the yield Y(E) of x-rays of energy E reaching said area A via the equation $$Y(E) = \frac{N_0}{A}\int_A dx\,dy \int_0^{L(x,y)} \frac{d\sigma^{scat}(E,\theta)}{d\Omega} P(x,y,z)\Delta\Omega(x,y,z)dz, \quad (11)$$

where n0 is the number of scatterers per unit volume, $\Delta\Omega$ is the solid angle subtended by said area A, viewed from location (x,y,z) in said scattering body, $d\sigma^{scat}/d\Omega$ is the scattering cross section per scatterer for scattering an x-ray from said source S into said area A, P(x,y,z) is the cumulative probability that the x-ray can penetrate to location (x,y,z) from source S and then exit said scattering body in the direction of area A without further scattering or being absorbed, the z integral is carried out over L(x,y), and the x and y integrals are carried out over said area A; and Eqn. 11 is used to adjust the thickness L(x,y) so that the yield y(E) is acceptably constant over the energy range ΔE.

13. The method of claim 12 wherein said illuminated scattering area A has radial symmetry about said axis, so that:

the thickness function L has the form L(r) and the probability function P(x,y,z) can be replaced by P(r,z), where r is the distance to said axis;

Eqn. 11 becomes $$Y(E) = \frac{N_0}{A}\int_{R_{in}}^{R_{out}} 2\pi r\,dr \int_0^{L(r)} \frac{d\sigma^{scat}(E,\theta)}{d\Omega} P(r,z)\Delta\Omega(r,z)dz, \quad (12)$$

where $R_{out}$ is the outer diameter of area A, $R_{in}$ is the radius of an inner blocking core; and Eqn. 12 is used to adjust L(r) so that the yield y(E) is acceptably constant over said energy range ΔE.

14. The method of claim 13 wherein said scattering material is a polymeric plastic displaying enhanced small angle x-ray scattering.

15. A method for accurately measuring the spectrum of an x-ray source S over a selected energy range ΔE using an energy dispersive x-ray detector D of area AD, comprising the steps of:

preventing said detector D from being directly irradiated by said x-ray source S;

placing a body of x-ray scattering material M, whose thickness as a function of location (x,y) is designated L(x,y), between said source S and said detector D;

restricting the area $A_M$ of said scattering body that is illuminated by x-rays from said source S so that only by scattering through a limited range of small angles in said scattering body can any x-rays reach said detector D from said source S; and adjusting L(x,y) so that the scattering efficiency into said detector D at all x-ray energies within said energy range ΔE is uniform to the desired degree.

16. The method of claim 15 wherein said scattering material displays enhanced elastic scattering at small angles.

17. The method of claim 15 wherein said scattering material is a polymeric plastic.

18. The method of claim 15 wherein:

said scattering body is thin enough so that the majority of x-rays reaching said detector D do so by only a single scattering interaction; and adjusting L(x,y) is performed by:

modeling the yield Y(E) of x-rays of energy E reaching said detector D in the single scattering approximation via the equation $$Y(E) = \frac{N_0}{A}\int_A dx\,dy \int_0^{L(x,y)} \frac{d\sigma^{scat}(E,\theta)}{d\Omega} P(x,y,z)\Delta\Omega(x,y,z)dz, \quad (13)$$

where $n_0$ is the number of scatterers per unit volume, $\Delta\Omega$ is the solid angle subtended by said detector D, viewed from location (x,y,z) in the body M, $d\sigma^{scat}/d\Omega$ is the cross section per scatterer for scattering an x-ray from said source S into said detector D, P(x,y,z) is the cumulative probability that the x-ray can penetrate to location (x,y,z) from source S and then exit the scatterer M in the direction of detector D without further scattering or being absorbed, the z integral is carried out over L(x,y), and the x and y integrals are carried out over said area $A_M$; and using Eqn. 13 to adjust the absorber thickness L(x,y) so that the yield y(E) is acceptably constant over the x-ray energy range ΔE.

19. The method of claim 15 wherein said illuminated scattering area A has radial symmetry about the axis connecting the center of said source S to the center of said detector D, so that:

the thickness function L(x,y) can be replaced by L(r) and the probability function P(x,y,z) can be replaced by P(r,z), where r is the distance to the axis of symmetry; and Eqn. 13 becomes $$Y(E) = \frac{N_0}{A}\int_{R_{in}}^{R_{out}} 2\pi r\,dr \int_0^{L(r)} \frac{d\sigma^{scat}(E,\theta)}{d\Omega} P(r,z)\Delta\Omega(r,z)dz, \quad (14)$$

where $R_{out}$ is the outer diameter of area A, $R_{in}$ is the radius of a blocking core; and Eqn. 14 is used to adjust L(r) so that the yield y(E) is acceptably constant over said x-ray energy range ΔE.

20. The method of claim 19 wherein said scattering material M is a polymeric plastic displaying enhanced small angle x-ray scattering.

21. An attenuator for reducing, by an amount that is uniform to a desired degree for all energies in a selected energy range ΔE, the flux of x-rays impinging on a selected area A from an x-ray source S, comprising:

a first x-ray absorber disposed in a line of sight between said source S and said area A;

a scattering body of x-ray scattering material disposed laterally of said x-ray absorber so as to scatter x-rays from said source S into said area A so that only x-rays scattered in said scattering body over an angular range of scattering angles reach said area A, said scattering body having a thickness as a function L of transverse position with respect to an axis running from the center of said source S to the center of said area A; and a second x-ray absorber disposed laterally of said scattering body so as to restrict the angular range of scattering angles so that only by forward scattering through a limited range of small angles in said scattering body can any x-rays reach said area A from said source S;

said scattering body being configured with L having a functional dependence on transverse position such that the scattering efficiency into said area A at all x-ray energies within said energy range ΔE is uniform to the desired degree.

22. The attenuator of claim 21 wherein said first x-ray absorber has an area at least commensurate with said area A in a direct line between said source S and said area A.

23. The attenuator of claim 21 wherein said second x-ray absorber blocks x-rays that could scatter by an angle outside said angular range of scattering angles.

24. The attenuator of claim 21 wherein said scattering material displays enhanced elastic scattering at small angles.

25. The attenuator of claim 21 wherein said scattering material is a polymeric plastic.

26. The attenuator of claim 21 wherein said scattering material is a low Z material.

27. The attenuator of claim 21 wherein said scattering body has radial symmetry about said axis.

28. The attenuator of claim 27 wherein said scattering body has a stepped profile.

29. The attenuator of claim 27 wherein said scattering body has a smooth profile.

30. An attenuator for reducing, by an amount that is uniform to a desired degree for all energies in a selected energy range ΔE, the flux of x-rays impinging on a selected area A from an x-ray source S, comprising:

means for preventing said area A from being directly irradiated by said source S;

a scattering body of x-ray scattering material between said source S and said area A so that only x-rays scattered in said scattering body over an angular range of scattering angles reach said area A, said scattering body having a thickness as a function L of transverse position with respect to an axis running from the center of said source S to the center of said area A; and means for restricting the angular range of scattering angles so that only by forward scattering through a limited range of is small angles in said scattering body can any x-rays reach said area A from said source S;

said scattering body being configured with L having a functional dependence on transverse position such that the scattering efficiency into said area A at all x-ray energies within said energy range ΔE is uniform to the desired degree.

31. The attenuator of claim 30 wherein said means for preventing said area A from being directly irradiated includes an x-ray absorber having an area at least commensurate with said area A in a direct line between said source S and said area A.

32. The attenuator of claim 30 wherein said means for preventing said area A from being directly irradiated is effected by restricting the angular range of x-rays emitted from said source S so that none of the x-rays emitted from said source S has a line of sight path to said area A so that only x-rays scattered by said scattering body reach said area A.

33. The attenuator of claim 30 wherein said means for restricting the angular range of scattering angles includes an x-ray absorber in a path that blocks x-rays that could scatter by an angle outside said angular range of scattering angles.

34. The attenuator of claim 30 wherein said means for restricting the angular range of scattering angles means for restricting the angular range of x-rays emitted from said source S.

35. The attenuator of claim 30 wherein said scattering material displays enhanced elastic scattering at small angles.

36. The attenuator of claim 30 wherein said scattering material is a polymeric plastic.

37. The attenuator of claim 30 wherein said scattering material is a low Z material.

38. The attenuator of claim 30 wherein said scattering body has radial symmetry about said axis.

39. The attenuator of claim 38 wherein said scattering body has a stepped profile.

40. The attenuator of claim 38 wherein said scattering body has a smooth profile.

* * * * *